Patented Sept. 2, 1947

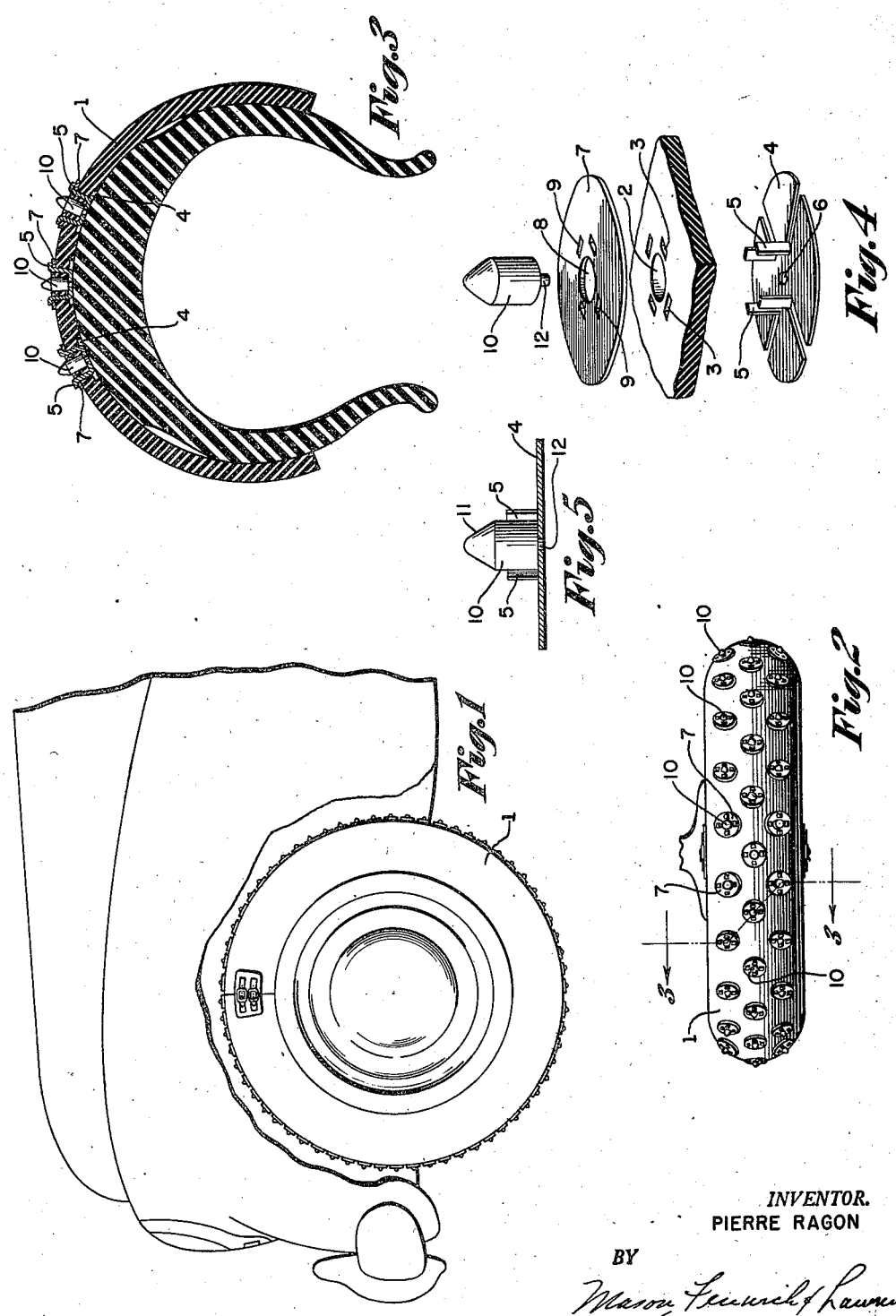

2,426,974

UNITED STATES PATENT OFFICE 2,426,974

TRACTION DEVICE FOR TIRES

Pierre Ragon, New York, N. Y.

Application February 19, 1947, Serial No. 729,427

3 Claims. (Cl. 152—210)

1

This invention relates to a traction device for use in connection with automobile tires, and more particularly to an improved calk attaching device by means of which non-skidding calks can be more effectively associated with a flexible band designed to encompass the tread of an automobile tire to give improved traction on ice or sleety road surfaces.

An object of the invention is to provide an improved calk attaching structure adapted to properly hold and position the calk with respect to the supporting band in such manner that the calk is held in proper position and the band is relieved of undue strains.

The invention consists in the novel construction, arrangement and combinations of parts hereinafter more particularly described and claimed.

One sheet of drawings accompanies this specification, as part thereof, in which like reference characters indicate like parts throughout.

In the drawings:

Figure 1 is a fragmentary side elevation of an automobile showing a front wheel with a band provided with the improved calks associated therewith;

Figure 2 is a top plan view of a tire such as illustrated in Figure 1;

Figure 3 is a transverse cross section taken on line 3—3 of Figure 2;

Figure 4 is an exploded view of the elements of the improved calk and calk attaching devices in relation to a fragmentary piece of the flexible band; and Figure 5 is a transverse cross section through washer member 4 and the calk member.

Referring to the drawings the numeral 1 indicates a flexible band of leather, fabric, rubber or any other suitable materials adapted to encompass and embrace the tread of a tire, as illustrated in Figure 1, having its ends joined by some removable coupling such as the straps and buckles illustrated.

Secured to this flexible band are a plurality of calk elements 10 arranged in staggered relationship so as to engage the road and improve the traction of the tire, thus reducing the tendency of the tire to skid on icy or sleety surfaces.

The present invention is directed to an improved method of attaching the calk elements per se to such a flexible band in such a manner as will reduce the tendency of the calk to tear the band under the heavy stresses imposed upon it.

To this end two washer-like members 4 and 7 are provided, the washer member 4 having a relatively small central orifice 6 through which a central stud 12 formed on the bottom face of the calk 10 is adapted to extend so that the calk 10 is properly centered and can be welded to the body of the washer 4. The washer 4 is further provided with radially cut-out prong members 5 which are bent perpendicularly with respect to the plane of the washer body 4 and are arranged in spaced circumferential relationship around the central orifice 6 and the calk 10.

The washer member 7 is provided with a central orifice 8 sufficiently large to permit the passage of the body of the calk member 10, and this central orifice 8 is surrounded by a plurality of circumferentially spaced slots 9 adapted to permit the passage of the prongs 5 formed on the washer member 4.

Preferably, the flexible band 1 will be stamped with spaced orifices 2 in preferred staggered relationship, each of these orifices 2 being surrounded by spaced circumferential slots 3 corresponding in size and spacing with the prongs 5 on the washer members 4, and the calk positioned thereon, so that in assembling the calks with the band, the washer members 4 will be positioned against the under face of the band with the calk and prong members 5 extending through the orifices 2 and 3 provided in the band, after which the washer members 7 will be positioned over the calk and over the projecting prong members 5, which prong members 5 are then clinched against the outer face of the washer members 7, thus securely locking the inner washer 4 and the outer washer 7, as is well illustrated in Figure 3.

By this construction it will be observed that the calk members 10 extend entirely through the band 1 and are rigidly associated with the washers 4 on the under face of the band, while any transverse stresses directed against the outer tapered portions 11 of the calks is resisted by the outer washers 7 as well as by the prongs 5 clinched against said outer washer and themselves rigidly associated with the under washer 4. By reason of this structure the maximum rigidity is provided to the calk members against such transverse strains and the life of the device is materially enhanced.

Having thus fully described my invention, I claim:

1. An improved calk device for use with a tire encasing band comprising two washer members, one of said washers formed with circumferentially spaced cut-out prongs bent at their inner attached ends perpendicular to the plane of the washer with a calk element centrally positioned on said washer symmetrically with respect to said prongs, with the second washer formed with a central orifice sized to receive the calk, said orifice surrounded by circumferentially spaced slots proportioned to receive the prongs formed on the first washer, said washers adapted to embrace the tire encasing band and to be secured by clinching of the prongs over the second washer, with the calk projecting beyond said second washer.

2. An improved calk device for use with a tire encasing band comprising two complementary washers and a calk element, said calk element rigidly secured centrally of one face of one washer which washer has radial prongs struck upwardly therefrom to positions parallel with the axis of the calk element, the second washer formed with a central orifice adapted to permit passage of the calk and a plurality of slots each positioned to receive one of said prongs, said washers with said associated calk and prongs adapted to be assembled in alignment on opposite faces of the flexible band and secured in such assembled relationship by clinching the ends of said prongs over the outer face of the outer washer as specified.

3. A traction device for tires comprising a flexible band with complementary washers in aligned engagement with the opposed faces of said band, one of said washers formed with a centrally projecting calk extending through the band and an orifice formed in the other washer, one of said washers formed with circumferentially spaced prongs extending through the band and similarly located slots in the other washer and clinched thereover to hold said elements in assembled position.

PIERRE RAGON.